United States Patent
Zimmermann et al.

(10) Patent No.: US 12,521,687 B2
(45) Date of Patent: Jan. 13, 2026

(54) METHOD FOR TREATING PARTICULATE MATERIAL IN A FLUIDIZING DEVICE

(71) Applicant: Glatt Gesellschaft mit beschränkter Haftung, Binzen (DE)

(72) Inventors: Dirk Zimmermann, Wehr (DE); Heinz Gottschling, Weil am Rhein (DE); Jochen Thies, Lörrach (DE)

(73) Assignee: Glatt Gesellschaft mit beschränkter Haftung, Binzen (DE)

( * ) Notice: Subject to any disclaimer, the term of this patent is extended or adjusted under 35 U.S.C. 154(b) by 180 days.

(21) Appl. No.: 18/260,885

(22) PCT Filed: Dec. 16, 2021

(86) PCT No.: PCT/EP2021/086076
§ 371 (c)(1),
(2) Date: Jul. 10, 2023

(87) PCT Pub. No.: WO2022/148623
PCT Pub. Date: Jul. 14, 2022

(65) Prior Publication Data
US 2024/0058781 A1    Feb. 22, 2024

(30) Foreign Application Priority Data

Jan. 11, 2021 (DE) ...................... 10 2021 200 163.7

(51) Int. Cl.
*B65G 53/22* (2006.01)
*B01J 8/00* (2006.01)
*B01J 8/44* (2006.01)

(52) U.S. Cl.
CPC ............... *B01J 8/44* (2013.01); *B01J 8/0015* (2013.01); *B01J 2208/00761* (2013.01)

(58) Field of Classification Search
None
See application file for complete search history.

(56) References Cited

U.S. PATENT DOCUMENTS

| | | | | |
|---|---|---|---|---|
| 2,804,349 A | * | 8/1957 | Pynor | B65G 53/22 406/89 |
| 2,953,875 A | * | 9/1960 | Mead | B01J 8/388 451/75 |
| 3,149,884 A | * | 9/1964 | Jones | B65G 53/58 406/138 |

(Continued)

FOREIGN PATENT DOCUMENTS

| | | |
|---|---|---|
| CN | 102215949 A | 10/2011 |
| CN | 111936225 A | 11/2020 |

(Continued)

*Primary Examiner* — Joseph A Dillon, Jr.
(74) *Attorney, Agent, or Firm* — The Webb Law Firm

(57) ABSTRACT

A method for treating particulate material in a fluidizing device. The fluidizing device includes a fluidizing unit having a perforated distributor plate dividing the fluidizing unit into a distributor chamber and a fluidizing chamber. The fluidizing chamber includes a material inlet and the distributor chamber includes a material discharge. In an operating condition, the fluidizing chamber is first filled through the material inlet with material to be treated and the material is then treated by the process gas flowing through the fluidizing chamber.

9 Claims, 9 Drawing Sheets

(56) References Cited

U.S. PATENT DOCUMENTS

| | | | | |
|---|---|---|---|---|
| 3,188,144 | A | * | 6/1965 | Gmur ................. B65B 1/16 406/90 |
| 3,343,886 | A | * | 9/1967 | Kemp ................. B61D 7/20 406/138 |
| 3,976,331 | A | * | 8/1976 | Kluger ................. B65G 53/22 222/61 |
| 4,239,421 | A | * | 12/1980 | Krauss ................. B65D 88/72 406/138 |
| 4,391,528 | A | * | 7/1983 | Klein-Albenhausen ................. B01F 33/408 366/29 |
| 4,489,862 | A | * | 12/1984 | Diem ................. B65D 90/54 222/630 |
| 5,096,096 | A | * | 3/1992 | Calaunan ................. B65G 53/22 406/122 |
| 5,115,578 | A | | 5/1992 | Basten |
| 11,964,267 | B2 | | 4/2024 | Gross et al. |
| 2002/0195164 | A1 | * | 12/2002 | Zahrah ................. B22F 3/004 141/93 |
| 2003/0190417 | A1 | | 10/2003 | Takei et al. |
| 2008/0006290 | A1 | * | 1/2008 | Yamanaka ................. B01D 41/04 134/32 |
| 2011/0220038 | A1 | | 9/2011 | Kauppinen et al. |
| 2013/0195562 | A1 | | 8/2013 | Viarouge et al. |
| 2024/0091729 | A1 | * | 3/2024 | Zimmermann ................. B01J 8/003 |
| 2024/0307840 | A1 | * | 9/2024 | Thies ................. B01J 8/44 |

FOREIGN PATENT DOCUMENTS

| | | |
|---|---|---|
| DE | 1150320 | 6/1963 |
| DE | 236006 A1 | 5/1986 |
| DE | 19528577 A1 | 2/1997 |
| DE | 19528584 A1 | 2/1997 |
| EP | 1878489 A2 | 1/2008 |
| EP | 2611531 A0 | 7/2013 |
| JP | H7265683 A | 10/1995 |
| WO | 9325303 A1 | 12/1993 |
| WO | 2012028894 A1 | 3/2012 |

* cited by examiner

METHOD FOR TREATING PARTICULATE MATERIAL IN A FLUIDIZING DEVICE

CROSS-REFERENCE TO RELATED APPLICATIONS

This application is the United States national phase of International Application No. PCT/EP2021/086076 filed Dec. 16, 2021, and claims priority to German Patent Application No. 10 2021 200 163.7 filed Jan. 11, 2021, the disclosures of which are hereby incorporated by reference in their entireties.

BACKGROUND

Field

The invention relates to a method for treating particulate material in a fluidizing device, with a fluidizing unit having a longitudinal axis, the fluidizing unit having a perforated distributor plate dividing the fluidizing unit into a distributor chamber and a fluidizing chamber arranged above the distributor chamber, wherein the fluidizing chamber comprises a material inlet for the material to be treated and the distributor chamber comprises a material discharge having a material outlet for the treated material having a lower and an upper edge over a material outlet surface and a barrier device closes the material discharge and wherein the distributor chamber comprises a fluid inlet and the fluidizing chamber comprises a fluid outlet for a process gas fluidizing the material in the fluidizing chamber flowing from the fluid inlet through the perforated distributor plate to the fluid outlet, wherein in an operating condition, the fluidizing chamber is first filled through the material inlet with material to be treated and the material is then treated by the process gas flowing through the fluidizing chamber.

Description of Related Art

Fluidizing devices for treating particulate material and in particular fluid bed devices have already been known for a long time.

EP 2 611 531 A1 discloses a fluid bed device for processing particulate material, which comprises a chamber enclosing a distributor chamber, a perforated distributor plate arranged above the distributor chamber, an inlet and an outlet for the process gas and a discharge opening having a lower and an upper edge, defining a height and an opening surface, wherein the distributor plate is positioned above the lower edge of the discharge opening such that the opening surface of the discharge opening is split into an opening surface below the distributor plate and an opening surface above the distributor plate.

The disadvantage here is that when discharging the particulate material at the discharge opening, the process gas forms a kind of curtain when it flows from the distributor chamber around the distributor plate into the fluidizing chamber. This curtain at least partly restricts the discharge of the particulate material and at the same time reduces the emptying speed of the particulate material from the fluidizing device.

SUMMARY

The aim of the invention is therefore on one hand further to improve the emptying of a fluidizing device with respect to the emptying speed and on the other at the same time to overcome the disadvantages of the prior art.

The aim is furthermore achieved with a method of the kind mentioned at the beginning in that the distributor chamber comprises a bar extending at least partly in a circumferential direction, arranged in the region of the material outlet surface and depending on the operating condition, the distributor plate movably arranged relative to the fluidizing unit is moved to the emptying position such that the distributor plate is arranged in the emptying condition on the bar such that a fluid connection is formed past the distributor plate between the material outlet arranged in the distributor chamber and the fluidizing chamber, and the treated material is discharged from the fluidizing unit through the material outlet, wherein in the emptying condition in the emptying position of the distributor plate, the barrier device releases the material discharge.

The advantage in this configuration resides in that the bar on which the distributor plate is arranged prevents the process gas flow from flowing around the distributor plate in the region of the material outlet surface, and thereby developing a kind of "process gas curtain", which restricts or completely prevents the discharge of the treated material. The bar furthermore prevents the material treated in the fluidizing chamber from falling during the discharge through the gap arising between the distributor plate and the distributor chamber inside wall into the distributor chamber.

Furthermore advantageously, the particulate material can be emptied after treatment through the material discharge by the relative movement between the distributor plate and the fluidizing unit. The relative movement can be performed in such a way and manner that the process gas assists the emptying of the treated material through the material discharge.

According to a configuration of the method advantageous in this respect, the fluidizing unit has a swivel axis extending transversely to the longitudinal axis of the fluidizing unit, on which swivel axis the distributor plate is arranged to swivel and around which the distributor plate is swivelled after the particulate material treatment, expediently by 5° to 10°. This design enables a simple relative movement in the form of a swivelling movement around the swivel axis. On one hand, the material outlet of the material discharge arranged in the distributor chamber is thereby preferably released for emptying the material treated in the fluidizing chamber and on the other, emptying is assisted by the inclined setting of the distributor plate. The distributor plate is furthermore preferably swivelled around the swivel axis by an angle between 0° and 60°, expediently by an angle of 5° to 10°. Due to the swivelling movement, a substantially crescent-shaped or circular gap forms between the distributor plate and the distributor chamber and/or the fluidizing chamber, which must not become too large, otherwise the risk arises that in the emptying condition, treated material can get into the distributor chamber in spite of the process gas flowing through the gap. The process gas expediently seals the gap in the emptying condition—where the bar is not arranged.

According to a configuration of the method also advantageous in this respect, the distributor plate is arranged movably in the axial direction of the longitudinal axis and is moved in the axial direction of the longitudinal axis as a linear movement, expediently until the distributor plate is positioned below the lower edge of the material outlet. The distributor plate is preferably moved in the axial direction of the longitudinal axis. Also, due to the alternative configuration, the material outlet is opened for improved emptying of the particulate material after treatment.

Particularly preferably, the distributor plate performs a swivelling movement and a linear movement when moving to the emptying position. Here, on one hand, the distributor plate is swivelled around the swivel axis by a swivelling movement and on the other, in the axial direction of the longitudinal axis as a linear movement. The swivelling and the linear movements can be performed in any order one after the other or at the same time. The advantages of both the swivelling and also the linear movement hereby come into effect.

According to a further advantageous configuration of the method, the distributor plate is moved to the emptying position relative to the fluidizing unit in such a way that at least a part of the distributor plate is positioned below the lower edge of the material outlet. In this respect, the distributor plate is moved to the emptying position relative to the fluidizing unit in such a way that the distributor plate is positioned below the lower edge of the material outlet. Alternatively, the upper edge or the upper side of the distributor plate is arranged flush with the lower edge of the material outlet. In either case, the material outlet surface is at maximum opening, so that emptying the treated material can take place efficiently and rapidly.

According to a further advantageous further development of the method, the material discharge has a barrier device, which releases the material discharge as soon as the distributor plate is in the emptying position. The barrier device preferably releases the material discharge as soon as at least a part of the distributor plate is positioned below the lower edge of the material outlet. The material outlet surface is thereby at maximum wide opening and the material treated in the fluidizing chamber of the fluidizing unit can be discharged effectively and expeditiously from the fluidizing unit of the fluidizing device.

According to a further advantageous further development of the method, a fluid connection comprising a fluid connection outlet for supplying an auxiliary gas is assigned to the material discharge designed in particular as an emptying pipe, wherein the auxiliary gas flows through the fluid connection outlet into the material discharge at least when the barrier device releases the material discharge, so as to assist the discharge of the treated material. It is possible to conduct a fluid to the material discharge through the fluid connection, expediently an auxiliary or backup gas so as to assist and improve the discharge of treated material. The auxiliary gas preferably corresponds to the process gas. Further preferably, the auxiliary gas is channeled off from the process gas and re-conducted to it in a recirculating manner after the material discharge.

Particularly preferably, the fluid connection outlet, in particular a part of the perforated cover or of the holes, is designed such that the auxiliary gas has an outflowing direction in the direction of the discharge of the treated material. This highly preferred further development further assists the discharge of the treated material.

A fluidizing device and its preferred and advantageous configurations are described in more detail in the following. The fluidizing device for treating particulate material with a fluidizing unit having a longitudinal axis, which has a perforated distributor plate dividing the fluidizing unit into a distributor chamber and a fluidizing chamber arranged above the distributor chamber, wherein the fluidizing chamber comprises a material inlet for the material to be treated and the distributor chamber comprises a material discharge having a material outlet for the treated material having a lower and an upper edge over a material outlet surface and a barrier device closes the material discharge and wherein the distributor chamber comprises a fluid inlet and the fluidizing chamber comprises a fluid outlet for a process gas fluidizing the material in the fluidizing chamber, flowing from the fluid inlet through the perforated distributor plate to the fluid outlet, wherein the distributor chamber comprises a bar extending at least partly in a circumferential direction, arranged in the region of the material outlet surface and the distributor plate is movably arranged relative to the fluidizing unit wherein the distributor plate can be brought to an emptying position relative to the fluidizing unit wherein the distributor plate is arranged in the emptying condition on the bar such that a fluid connection is formed past the distributor plate between the material outlet arranged in the distributor chamber and the fluidizing chamber, so as to discharge treated material from the fluidizing unit, and wherein in the emptying condition in the emptying position of the distributor plate, the barrier device releases the material discharge.

The advantage in this configuration resides in that the bar on which the distributor plate is arranged prevents the process gas flow from flowing around the distributor plate in the region of the material outlet surface, and thereby developing a kind of "process gas curtain", which restricts or completely prevents the discharge of the treated material. The bar furthermore prevents the material treated in the fluidizing chamber from falling during the discharge through the gap arising between the distributor plate and the distributor chamber inside wall into the distributor chamber.

Advantageously, the particulate material can be emptied after treatment through the material discharge by the relative movement between the distributor plate and the fluidizing unit. The relative movement can be performed in such a way and manner that the process gas assists the emptying of the treated material through the material discharge.

According to a configuration of the fluidizing device advantageous in this respect, the distributor plate is arranged in an operating position preferably above the upper edge of the material outlet. If the distributor plate is in operating position, the fluidizing device is in the operating condition. In the operating position, the material can therefore be treated in the fluidizing chamber without a material discharge through the material outlet.

In the emptying position, the distributor plate is positioned preferably at least partly below the upper edge of the material outlet by a movement of the distributor plate relative to the fluidizing unit. In the emptying position, the fluidizing unit is in the emptying condition.

According to a particularly advantageous further development of the fluidizing device, an upper side of the bar is arranged tangentially to the material outlet surface of the material outlet, or is arranged contrary to the direction of flow of the process gas below the material outlet. Such an arrangement of the bar in the distributor chamber significantly improves the discharge of the treated material from the fluidizing unit, in particular from the fluidizing chamber. In this respect, the upper side of the bar is expediently arranged tangentially to the lower edge of the material outlet surface of the material outlet. This configuration is particularly advantageous, since in this way, the treated material can be discharged barrier-free from the fluidizing unit.

The bar is furthermore preferably designed as a crescent shape, in particular as a crescent moon, or circular. This has least influence on the process gas flow, such that fluidizing of the material to be treated in the fluidizing chamber in the operating position continues to function very well.

According to a configuration of the fluidizing device advantageous in this respect, the fluidizing unit has a swivel axis extending transversely to the longitudinal axis of the fluidizing unit, on which swivel axis the distributor plate is arranged to swivel. The swivel axis expediently extends perpendicular to the central longitudinal axis of the fluidizing unit. This design enables a simple relative movement in the form of a swivelling movement around the swivel axis. On one hand, the material outlet of the material discharge arranged in the distributor chamber is thereby opened for emptying the material treated in the fluidizing chamber and on the other, emptying is assisted—as well as for fluids—by the inclined position of the distributor plate. The distributor plate is furthermore preferably swivelled around the swivel axis by an angle between 0° and 60°, expediently by an angle of 5° to 10°. Due to the swivelling movement, a substantially circular or crescent-shaped gap forms between the distributor plate and the distributor chamber and/or the fluidizing chamber, which must not become too large, otherwise the risk arises that in the emptying condition, treated material can get into the distributor chamber in spite of the process gas flowing through the gap. In principle, the gap is sealed by the process gas. In the region of the material outlet, the fluidizing unit, in particular the distributor chamber, has no gap due to the bar extending at least partly in a circumferential direction. The distributor plate swivels around the swivel axis and is arranged on the bar.

In a furthermore advantageous alternative configuration of the fluidizing device, the distributor plate is arranged movably in the axial direction of the longitudinal axis. The distributor plate is moved in the axial direction of the longitudinal axis as a linear movement. Expediently the distributor plate is moved until its upper side is positioned flush with the lower edge or below same. The distributor plate is preferably arranged movably in the axial direction of the longitudinal axis. Also, due to the alternative configuration, the material outlet is opened for improved emptying of the particulate material after treatment.

Furthermore advantageously the fluidizing unit has a swivel axis extending transversely to the longitudinal axis of the fluidizing unit, and arranged movably in the axial direction of the longitudinal axis on which swivel axis the distributor plate is arranged to swivel. This configuration of the fluidizing device combines the advantages of both alternative configurations of the preferred fluidizing device, namely the swivelling and linear movements. Furthermore—where the bar is not arranged—the gap that forms between the fluidizing unit and the distributor plate is smaller.

According to a further advantageous design of the fluidizing device, the distributor plate, in particular the upper side of the distributor plate, is positioned in the emptying position by the movement of the distributor plate relative to the fluidizing unit at least partly below the lower edge of the material outlet. Particularly preferably, the distributor plate, in particular the upper side of the distributor plate, is positioned in the emptying position by the movement of the distributor plate relative to the fluidizing unit below the lower edge of the material outlet. The material outlet surface is thereby at maximum opening, so that emptying the treated material can take place efficiently and rapidly.

Advantageously, a fluid connection comprising a fluid connection outlet for supplying an auxiliary gas is assigned to the material discharge designed in particular as an emptying pipe. It is possible to conduct a fluid to the material discharge through the fluid connection, expediently an auxiliary or backup gas so as to assist and improve the discharge of treated material. The auxiliary gas preferably corresponds to the process gas. Further preferably, the auxiliary gas is channeled off from the process gas and is re-conducted to same in a recirculating manner after the material discharge.

In this respect, according to a further development of the fluidizing device, the material discharge has a base insert, which divides the material discharge into a material channel transporting the treated material out of the fluidizing unit and a fluid channel conducting the auxiliary gas, wherein the fluid connection outlet is arranged in the base insert, such that the auxiliary gas can overflow from the fluid channel into the material channel. This provides a very simple and space-saving construction for supplying the auxiliary gas, in particular auxiliary air.

The fluid connection outlet preferably has a perforated cover or is formed by holes in the base insert. The perforated cover or the correspondingly arranged holes prevent the treated material to be discharged from the fluidizing unit from falling into and blocking the fluid connection. The fluid connection outlet, in particular a part of the perforated cover or the holes, is particularly preferably designed such that the auxiliary gas has an outflow direction in the direction of the treated material discharge. This highly preferred further development further assists the discharge of the treated material.

The fluid connection outlet is expediently arranged in the region of the material outlet surface. This ensures that the auxiliary gas assists and/or supports the treated material to be discharged immediately after the material outlet.

The method is preferably implemented on the fluidizing device described previously.

BRIEF DESCRIPTION OF THE DRAWINGS

The invention is described below in greater detail on the basis of the attached drawing, and this shows FIG. 1 a top view onto a diagram of a first embodiment of a fluidizing device in the operating position with a section plane A-A, FIG. 2 a section along the section plane A-A illustrated in FIG. 1 by the diagram of the first embodiment of the fluidizing device in the operating position with a distributor plate in a horizontal position arranged on a swivel axis, FIG. 3 a section along the section plane A-A illustrated in FIG. 1 by the diagram of the first embodiment of the fluidizing device in the emptying position with a distributor plate arranged on the swivel axis in a position swivelled by an angle α around the swivel axis, FIG. 4 a top view onto the diagram of the first embodiment of the fluidizing device in the emptying position, FIG. 5 a diagram of a projection of an interior of the distributor chamber of the first embodiment of the fluidizing device in the emptying position comprising a bar and a material outlet, FIG. 6 a top view onto a diagram of a second embodiment of a fluidizing device in the operating position with a section plane A-A, FIG. 7 a section along the section plane A-A illustrated in FIG. 6 by the diagram of the second embodiment of the fluidizing device in the operating position with a distributor plate in a horizontal position arranged in a plane Z-Z, FIG. 8 a section along the section plane A-A illustrated in FIG. 6 by the diagram of the second embodiment of the fluidizing device in the emptying position with the distributor plate in a horizontal position arranged in a plane Z'-Z', FIG. 9 a magnified illustration of the section A illustrated in FIG. 8, FIG. 10 a top view onto a diagram of a third embodiment of a fluidizing device in the operating position with a section plane A-A, FIG. 11 a section along the section plane A-A of FIG. 10 through the diagram of the third embodiment of the fluidizing device in the operating position with a distributor plate in a horizontal position arranged in a plane Z-Z, FIG. 12 a section along the section plane A-A of FIG. 10 through the diagram of the third embodiment of the fluidizing device in the emptying position, wherein the distributor plate is moved into a plane Z'-Z' in the axial direction of the longitudinal axis X-X and swivelled around a swivel axis by an angle α, FIG. 13 a top view onto a diagram of a fourth embodiment of a fluidizing device in the operating position with a section plane A-A, FIG. 14 a section along the section plane A-A of FIG. 13 through the diagram of the fourth embodiment of the fluidizing device in the operating position with a distributor plate in a horizontal position arranged in a plane Z-Z and a material discharge comprising a base insert, FIG. 15 a section along the section plane A-A illustrated in FIG. 13 by the diagram of the first embodiment of the fluidizing device in the emptying position with the distributor plate arranged on the swivel axis in a position swivelled by an angle α around the swivel axis, FIG. 16 a top view onto the diagram of the fourth embodiment of the fluidizing device in the emptying position, FIG. 17 a diagram of a projection of an interior of the distributor chamber of the fourth embodiment of the fluidizing device in the emptying position comprising a bar and a material outlet, FIG. 18 a top view onto a diagram of a fifth embodiment of a fluidizing device in the operating position with a section plane A-A, and FIG. 19 a section along the section plane A-A illustrated in FIG. 18 by the diagram of the fifth embodiment of the fluidizing device in the emptying position with the distributor plate arranged on the swivel axis in a position swivelled by an angle α around the swivel axis.

DETAILED DESCRIPTION

Figure 1:
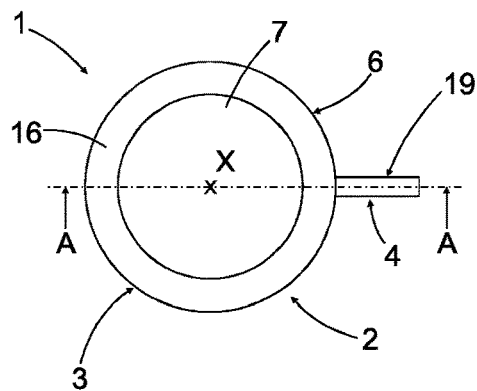

As long as no different specifications are made, the following description relates to all of the embodiments of a fluidizing device 1 for treating particulate material M illustrated in the drawing.

FIG. 1 shows a top view onto a diagram of a first embodiment of the fluidizing device 1 designed as a fluid bed device 2 with a section plane A-A. The fluidizing device 1 comprises a fluidizing unit 3 having a central longitudinal axis X-X on which an emptying pipe 4 comprising a central axis Y-Y perpendicular to the longitudinal axis X-X is arranged. The central axis Y-Y and the longitudinal axis X-X span the section plane A-A. The fluidizing device 1 is in the operating condition.

Figure 2:
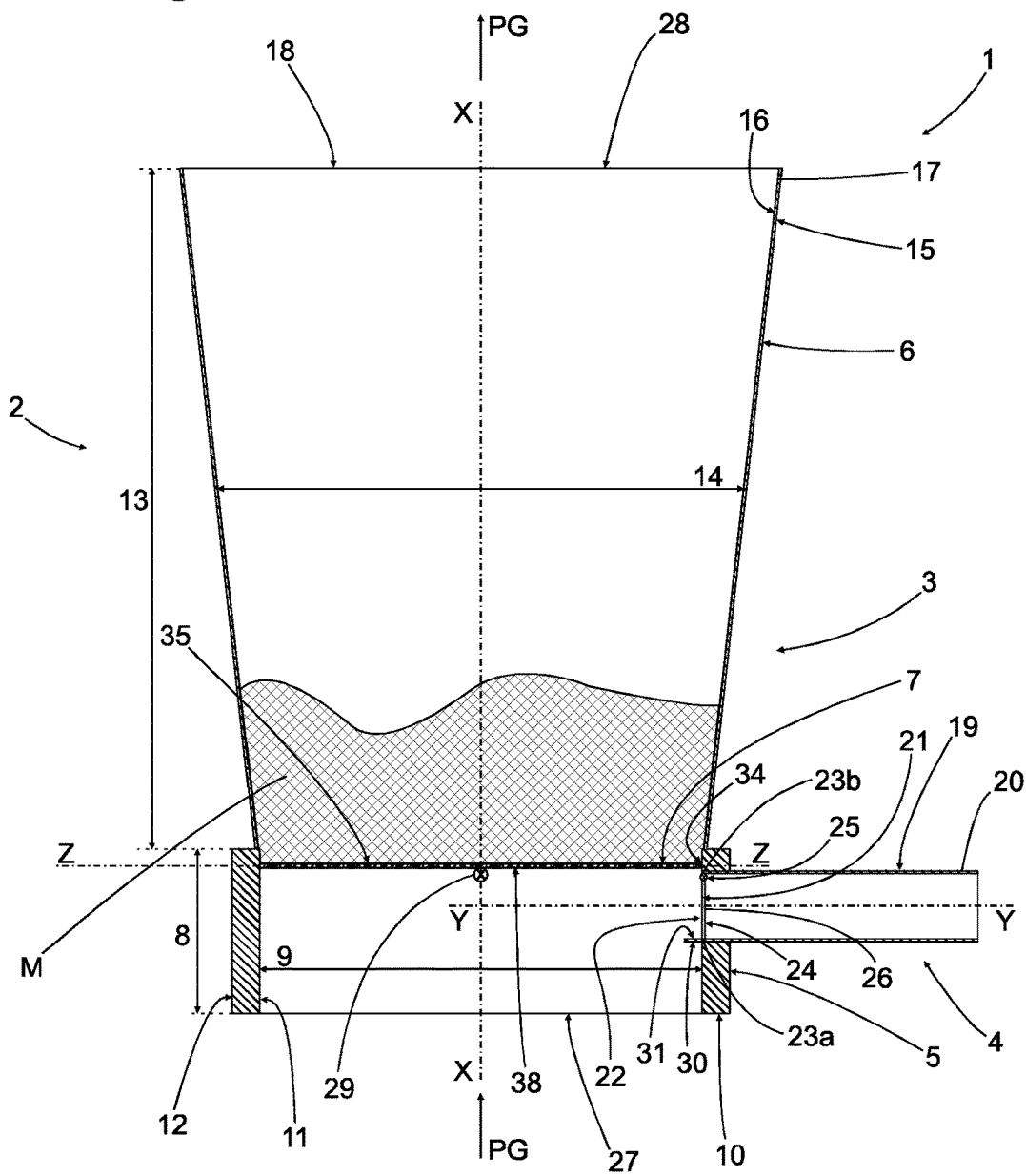

FIG. 2 illustrates a section along the section plane A-A shown in FIG. 1 by the diagram of the first embodiment of the fluidizing device 1 designed as a fluid bed device 2 in the operating position.

The fluidizing unit 3 comprises a perforated distributor plate 7 dividing the fluidizing unit 3 into a distributor chamber 5 and a fluidizing chamber 6 arranged above the distributor chamber 5. In the operating position, the distributor plate 7 is situated in a spanned plane Z-Z perpendicular to the section plane A-A, such that in the operating position, a material M to be treated is arranged in the fluidizing chamber 6 above the distributor plate 7. If the distributor plate 7 is in an operating position, the fluidizing device 1 is in the operating condition.

The fluidizing unit 3 of the fluidizing device 1 designed as a fluid bed device 2 is designed to be rotationally symmetrical around the central longitudinal axis X-X. Other geometric shapes, such as rectangular, in particular square, are implemented in other embodiments, not shown.

In the embodiment shown in FIG. 2, the distributor chamber 5 has a circular cylindrical shape with a distributor chamber inside diameter 9 constant over a height 8 of the distributor chamber. The distributor chamber 5 disposes of a distributor chamber wall 10, radially distanced from the longitudinal axis X-X. The distributor chamber wall 10 has an inside surface of the distributor chamber wall 10 designated distributor chamber inside wall 11 and an outside surface of the distributor chamber wall 10 designated distributor chamber outside wall 12.

The fluidizing chamber 6 is also designed as circular cylindrical in the illustrated embodiment, wherein in contrast to the distributor chamber 5, the fluidizing chamber 6 has a conical shape with a fluidizing chamber inside diameter 14 becoming larger from bottom to top over a fluidizing chamber height 13. The fluidizing chamber 6 disposes of a fluidizing chamber wall 15 radially distanced from the longitudinal axis X-X. The fluidizing chamber wall 15 has an inside surface of the fluidizing chamber wall 15 designated fluidizing chamber inside wall 16 and an outside surface of the fluidizing chamber wall 15 designated fluidizing chamber outside wall 17.

The fluidizing chamber 6 furthermore comprises a material inlet 18 for the material M to be treated and the distributor chamber 5 comprises a material discharge 19 for the treated material M'. The material discharge 19 is designed in particular as an emptying pipe 4 having an emptying pipe wall 20, which, in the embodiment illustrated in FIG. 2, is arranged perpendicular to the longitudinal axis X-X of the fluidizing unit 3, rotationally symmetrical around the central axis Y-Y in the distributor chamber wall 10. Here, a material outlet 21 of the material discharge 19 is arranged such that the material outlet 21 is flush with the distributor chamber inside wall 11. The material outlet 21 has a material outlet surface 22 and disposes of a lower and an upper edge 23a, 23b for discharging the material M' treated in the fluidizing chamber 6.

The material outlet 21 of the material discharge 19 has a barrier device 24. The barrier device 24 is closed when the distributor plate 7 is in the operating position. The barrier device 24 is expediently designed as a flap 26 swivelling around a swivel axis 25. In the operating condition, the material discharge 19 of the fluidizing unit 3 of the fluidizing device 1 is therefore closed. The barrier device 24 can furthermore be arranged in the direction of the central axis Y-Y at another position in the material discharge 19 designed as an emptying pipe 4.

The distributor chamber 5 furthermore has a fluid inlet 27 and the fluidizing chamber 6 has a fluid outlet 28. In the operating position shown in FIG. 2, the perforated distributor plate 7 is arranged in a horizontal position in the plane Z-Z, wherein a process gas PG enters the fluidizing unit 3 at the fluid inlet 27 and flows from the fluid inlet 27 through the perforated distributor plate 7 to the fluid outlet 28, where it exits the fluidizing unit 3. The perforated distributor plate 7 expediently has flow-through openings, not illustrated, for the process gas PG, which cause a pressure loss during flow-through. In the operating condition, therefore with the distributor plate 7 in the operating position, the process gas PG fluidizes the material M to be treated in the fluidizing chamber 6.

The distributor plate 7 is in the fluidizing unit 3 arranged movably relative to the fluidizing unit 3. In the embodiment of the fluidizing device 1 shown in FIG. 2, the fluidizing unit 3 has a swivel axis 29 extending transversely to the longitudinal axis X-X of the fluidizing unit 3, on which swivel axis the distributor plate 7 is arranged to swivel. In the illustrated first embodiment of the fluidizing device 1, the swivel axis 29 expediently extends perpendicular to the longitudinal axis X-X of the fluidizing unit 3 and perpendicular to the central axis Y-Y of the emptying pipe 4. In the operating condition of the fluidizing device 1 illustrated in FIG. 2, the distributor plate 7 is arranged above the upper edge 23b. This ensures that no material M is discharged from the fluidizing unit 3 of the fluidizing device 1 during the treatment of particulate material M by the process gas PG in the fluidizing chamber 6.

The distributor chamber 5 furthermore has a bar 30 extending at least partly in a circumferential direction arranged in the region of the material outlet surface 22. An upper side 31 of the bar 30 is arranged tangentially to the material outlet surface 22 of the material outlet 21. The upper side 31 of the bar 30 is expediently arranged tangentially to the lower edge 23a of the material outlet surface 22 of the material outlet 21. The bar 30 is designed here in a crescent shape, in particular a crescent moon shape.

Figure 3:
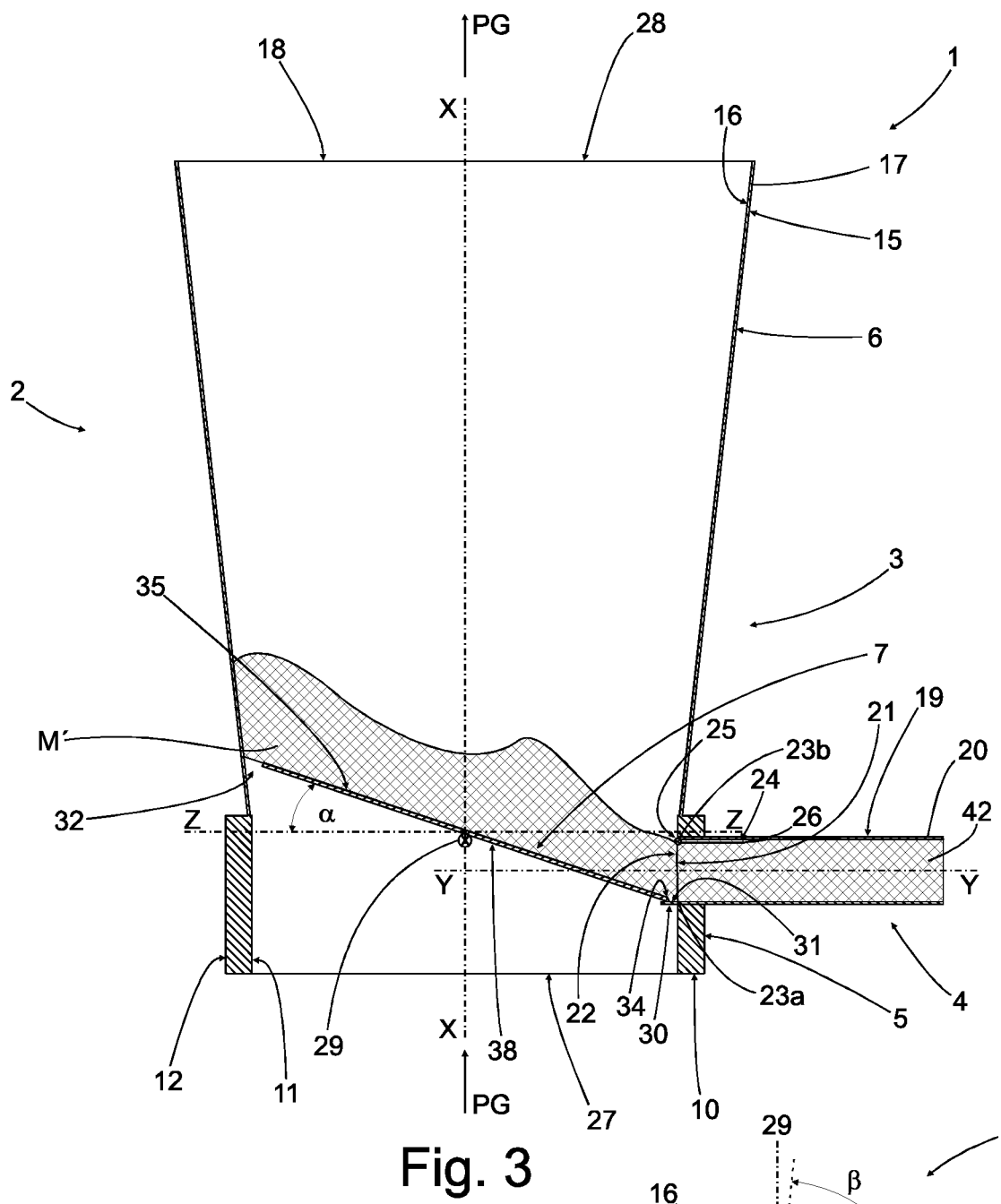

FIG. 3 shows the fluidizing device 1 designed as a fluid bed device 2 in the emptying condition. After treatment of the particulate material M in the fluid bed device 2, the treated material M' is discharged in the emptying condition from the fluidizing device 1 through the material channel 42. To do this, the distributor plate 7 movable to an emptying position is moved relatively towards the fluidizing unit 3 in a swivelling movement, such that same is positioned in the fluidizing unit 3, swivelled in an emptying position around a swivel axis 29. If the distributor plate 7 is in the emptying position, the fluidizing device 1 is in the emptying condition.

In the emptying position, the distributor plate 7 is swivelled by an angle α around the swivel axis 29, such that the distributor plate 7 is arranged on the bar 30. A fluid connection is formed as a result past the distributor plate 7 between the material outlet 21 arranged in the distributor chamber 5 and the fluidizing chamber 6, so as to discharge treated material from the fluidizing unit 3. The distributor plate 7 is expediently swivelled by an angle of 5° to 10°. The treated material M' thereby flows in the direction of the material outlet. The discharge of the treated material M' is supported by the process gas PG, which also flows in the emptying condition from the fluid inlet 27 to the fluid outlet 28 through the fluidizing unit 3 of the fluidizing device 1.

As soon as the distributor plate 7 in the emptying condition is arranged on the bar 30 in the emptying position, the barrier device 24 releases the material discharge 19. The material M' treated in the fluidizing unit 3 is then discharged. In the emptying condition, the barrier device 24 preferably opens as wide as possible such that the material outlet surface 22 of the material outlet 21 is at maximum size, which favours an improved discharge of the treated material M'.

In the emptying position, due to the swivelling movement of the distributor plate 7 swivelled around the swivel axis 29, a gap 32 is formed between the distributor plate 7 and the fluidizing unit 3, in particular between the distributor plate 7 and the distributor chamber inside wall 11 and/or the fluidizing chamber inside wall 16, the gap extending substantially around the entire circumference of the distributor plate 7. A gap width formed here varies. In the emptying condition, process gas PG flows through the gap 32, such that treated material M' cannot get or fall into the distributor chamber 5 during the discharge from the fluidizing chamber 6.

In the region of the material outlet 21, the bar 30 prevents on one hand the material M' from getting or falling in, and on the other the bar 30, on which the distributor plate 7 is arranged, prevents the process gas flow from flowing around the distributor plate 7 in the region of the material outlet surface 22 and thereby forming a kind of "process gas curtain", which restricts or completely prevents the discharge of the treated material.

Figures 4, 5:
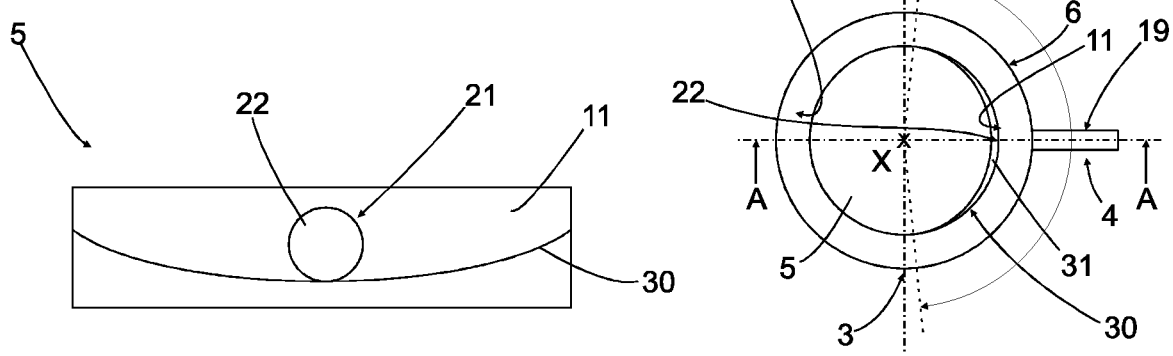

FIG. 4 shows a top view onto a diagram of the first embodiment of a fluidizing device 1 according to FIG. 1, wherein the fluidizing device 1 is in the emptying condition. Here, the distributor plate 7 is arranged in a position on the bar 30 swivelled by the angle α around the swivel axis 29, whereby the gap 32 varying in gap width is formed between the distributor plate 7 and the fluidizing unit 3, in particular the distributor chamber inside wall 11 and/or the fluidizing chamber inside wall 16. Process gas PG flows through the gap 32 during the emptying process, such that no treated material M' can get into the distributor chamber 5.

In the region of the material outlet surface 22, the bar 30 arranged in the distributor chamber 5 extends in a circumferential direction. The upper side 31 of the bar 30 is arranged tangentially to the lower edge 23a of the material outlet surface 22 of the material outlet 21. The bar 30 here is crescent-shaped, in particular a crescent moon shape. The bar 30 has an angle β of 160°. In other embodiments not shown here, the bar 30 preferably has an angle β of 5° to 180°, more preferably of 10° to 60°.

FIG. 5 shows a diagram of a projection of a distributor chamber inside wall 11 comprising the bar 30 and a material outlet 21 of the first embodiment of the fluidizing device 1 in the emptying position. As already described in FIG. 4, the upper side 31 of the bar 30 is arranged tangentially to the lower edge 23a of the material outlet surface 22 of the material outlet 21. The material outlet surface 22 is thus opened to maximum size. In the emptying position, the barrier device 24 not illustrated in FIG. 5 releases the material discharge 19, such that the treated material M' can be efficiently discharged from the fluidizing chamber 6 over the material outlet surface 22, opened to maximum, of the fluidizing unit 3. The projected illustration comprises the bar 30 in a crescent-shaped design, wherein the bar 30 has an angle β of approximately 160°.

Figure 6:
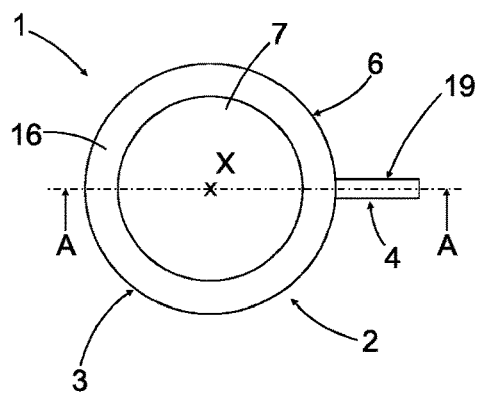

FIG. 6 shows a top view according to FIG. 1 onto a diagram of a second embodiment of the fluidizing device 1 designed as a fluid bed device 2 with a section plane A-A. The fluidizing device 1 comprises a fluidizing unit 3 having a central longitudinal axis X-X on which an emptying pipe 4 comprising a central axis Y-Y perpendicular to the longitudinal axis X-X is arranged. The central axis Y-Y and the longitudinal axis X-X span the section plane A-A. The fluidizing device 1 is in the operating condition.

Figure 7:
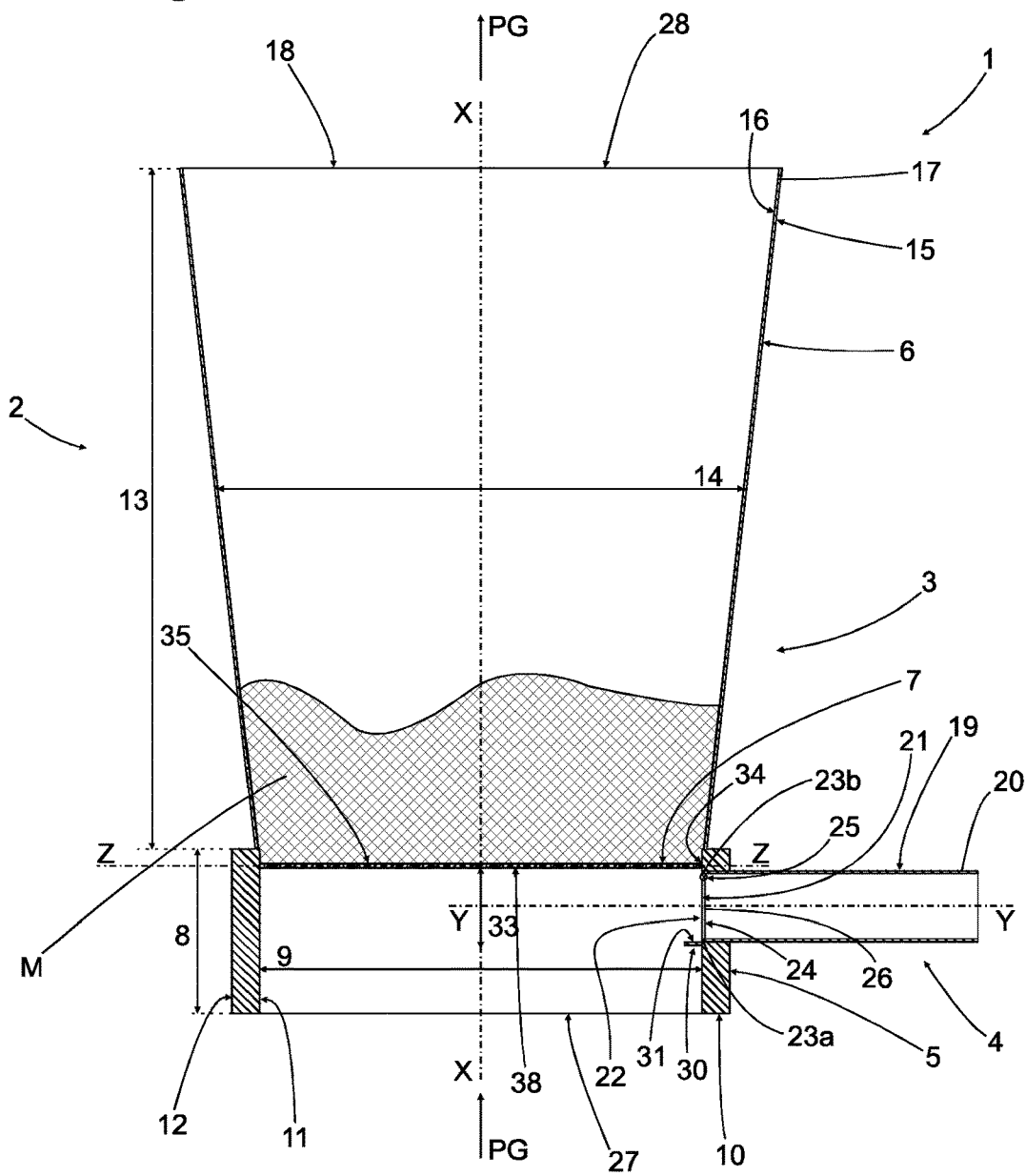

A section along the section plane A-A of FIG. 6 is illustrated in FIG. 7 by the diagram of the second embodiment of the fluidizing device 1 in the operating condition. In the operating position, the distributor plate 7 lies in a spanned plane Z-Z perpendicular to the section plane A-A, such that in the operating condition a material M to be treated is arranged in the fluidizing chamber 6 above the distributor plate 7 and can be fluidized and treated there.

The second embodiment of the fluidizing device 1 is furthermore designed to be substantially structurally identical to the first embodiment of the fluidizing device 1. The two embodiments differ in the technical implementation of the relative movement performed between the fluidizing unit 3 and the distributor plate 7. Instead of the swivelling movement—as in the first embodiment—the distributor plate 7 in the second embodiment performs a linear movement in the axial direction 33 of the longitudinal axis X-X. The distributor plate 7 is therefore arranged movably in the axial direction 33 of the longitudinal axis X-X.

The bar 30 is furthermore arranged below the material outlet 21, contrary to the direction of flow of the process gas, which further differentiates the second embodiment from the first embodiment. The bar 30 is thus arranged distanced from the lower edge 23a of the material outlet surface 22. In particular, the distance c in embodiments not shown is infinitesimally small, expediently equal to zero.

Figure 8:
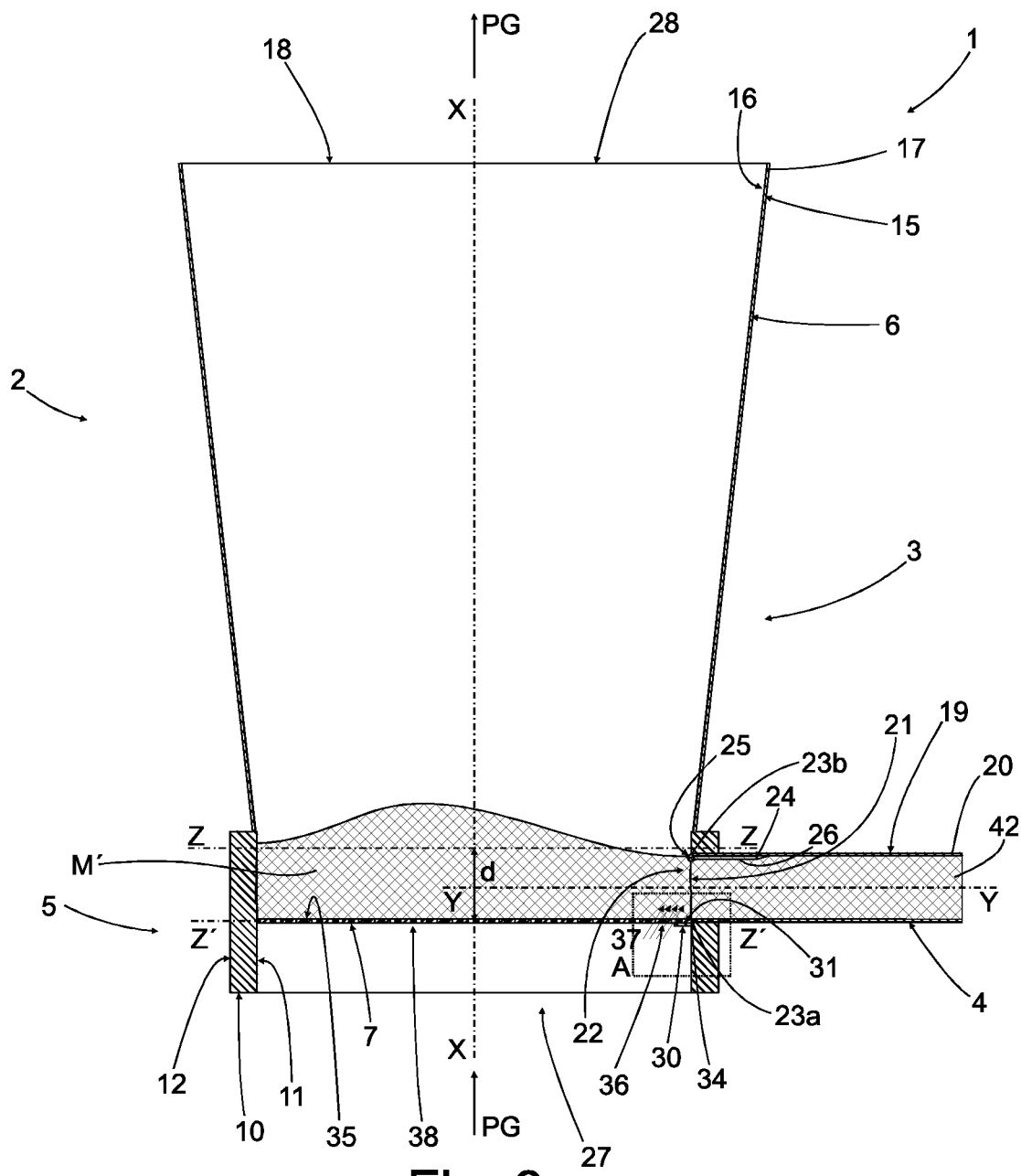

FIG. 8 shows a section along the section plane A-A of FIG. 6 through the diagram of the emptying position of the second embodiment of the fluidizing device 1 with a distributor plate 7 in a horizontal position arranged in a plane Z'-Z'. The plane Z'-Z' extends parallel to the plane Z-Z at a distance d. The distributor plate 7 is moved downwards by the distance d in the axial direction 33 of the central longitudinal axis X-X, that is to say out of the plane Z-Z into the plane Z'-Z'. The distributor plate 7 in the embodiment shown rests on the bar 30, such that an upper edge 34 of the distributor plate 7 and/or an upper side 35 is expediently arranged at the same height as the lower edge 23a of the material outlet 21. The upper edge 34 and/or the upper surface 35 of the distributor plate 7 is in particular arranged tangentially to the lower edge 23a of the material outlet 21. The material outlet surface 22 of the material outlet 21 is thus fully open, such that the discharge of treated material M' through the material channel 42 can be improved.

At least one discharge opening 36 is expediently arranged in the perforated distributor plate 7 in the region of the material outlet 21, in particular several discharge openings 36, which are aligned according to the illustrated arrows 37 towards the material outlet 21. In the emptying condition, this further supports the discharge of the material M' treated by the process gas PG.

Figure 9:
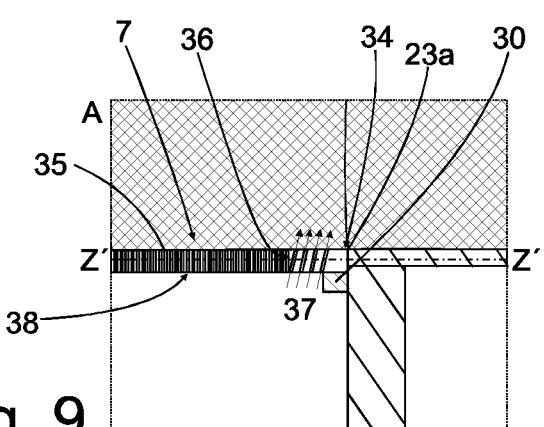

FIG. 9 shows a magnified illustration of the section A illustrated in FIG. 8, which shows the region of the material outlet 21. The perforated distributor plate 7 has flow-through openings 38 through which the process gas PG flows so as to fluidize the particulate material M to be treated in the fluidizing chamber 6. The flow-through openings 38 can be arranged randomly, wherein the flow-through openings 38 are designed accordingly in number and flow-through opening diameter for the specific requirements for fluidizing and/or treating the material M.

In the region of the material outlet 21, discharge openings 36 are arranged in the perforated distributor plate 7. The process gas PG flows in the direction of the arrows 37 through the discharge openings 36 and thus in the emptying position supports an efficient and rapid discharge of the treated material M'. The discharge openings 36 can for example be arranged in a circular sector in front of the material outlet 21. The upper edge 34 and/or the upper side 35 of the distributor plate 7 can furthermore be lowered flush to the height of the lower edge 23a of the material outlet 21, whereby the discharge of the treated material M' is further assisted and favoured because the material outlet surface 22 is as large as possible.

Figure 10:
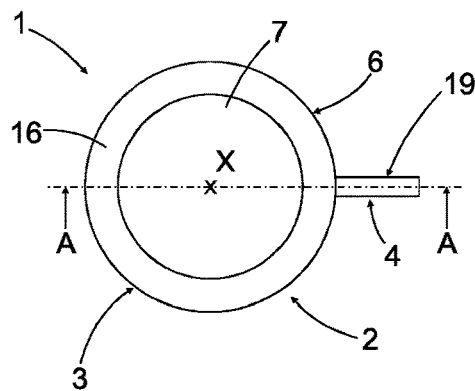

FIG. 10 shows a top view onto a diagram of a third embodiment of the fluidizing device 1 designed as a fluid bed device 2 with a section plane A-A. The fluidizing device 1 comprises a fluidizing unit 3 having a central longitudinal axis X-X on which an emptying pipe 4 comprising a central axis Y-Y perpendicular to the longitudinal axis X-X is arranged, wherein the central axis Y-Y and the longitudinal axis X-X span the section plane A-A. The fluidizing device 1 is in the operating condition.

Figure 11:
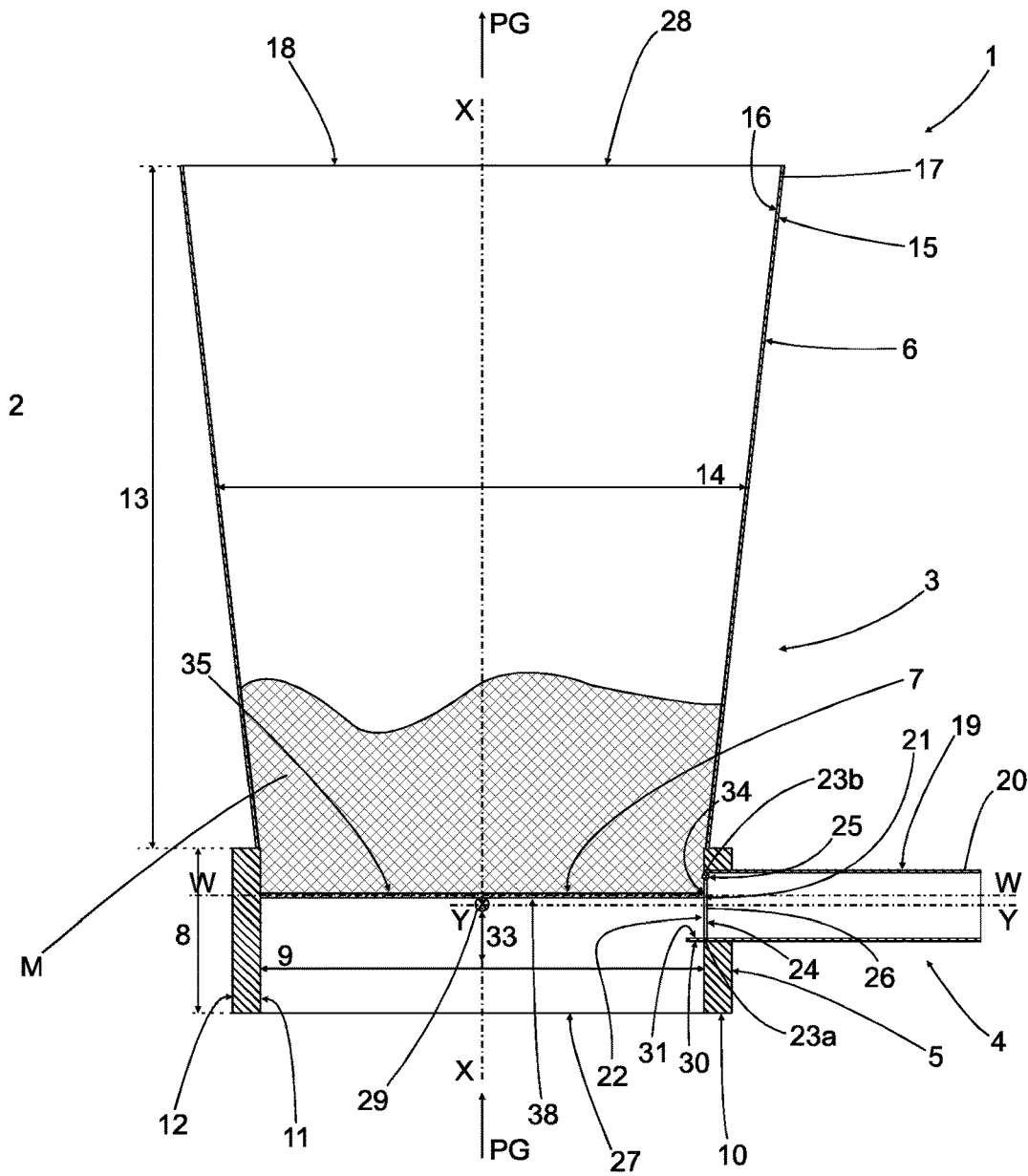

FIG. 11 shows a section along the section plane A-A of FIG. 9 through the diagram of the third embodiment of the fluidizing device 1 in the operating condition with a distributor plate 7 arranged in a horizontal position in a plane W-W.

The third embodiment of the fluidizing device 1 is substantially a combination of the first two embodiments. The distributor plate 7 in the third embodiment is also movable relative to the fluidizing unit 3. In contrast to the first and second embodiments, the distributor plate 7 of the third embodiment is suitable on one hand for performing a swivelling movement around the swivel axis 29 and on the other for performing a linear movement in the axial direction 33 of the longitudinal axis X-X. In the illustrated operating condition, the particulate material M is treated in the fluidizing chamber 6.

When moving the distributor plate 7 out of the operating position into the emptying position, the swivelling and linear movements of the distributor plate can be performed in any order one after the other or together at the same time. The advantages of both the swivelling movement and the linear movement thereby come into effect. In the present embodiment, the swivelling and linear movements are performed at the same time.

The material discharge 19 has a barrier device 24 swivelling around a swivel axis 25. The barrier device 24 is expediently designed as a flap 26, a valve or rotary valve or the like. The barrier device 24 designed in the third embodiment as a flap 26 closes the material discharge 19 or releases it. In the operating condition illustrated in FIG. 11—the distributor plate 7 is located above the lower edge 23a and below the upper edge 23b of the material outlet 21—the barrier device 24 closes the material discharge 19. Neither process gas PG nor material M still to be treated can therefore flow out or be conducted out of the fluidizing unit 3 of the fluidizing device 1, in particular out of the fluidizing chamber 6. In the shown embodiment, the flap 26 can swivel around a swivel axis 25 arranged normal to the central axis Y-Y.

Figure 12:
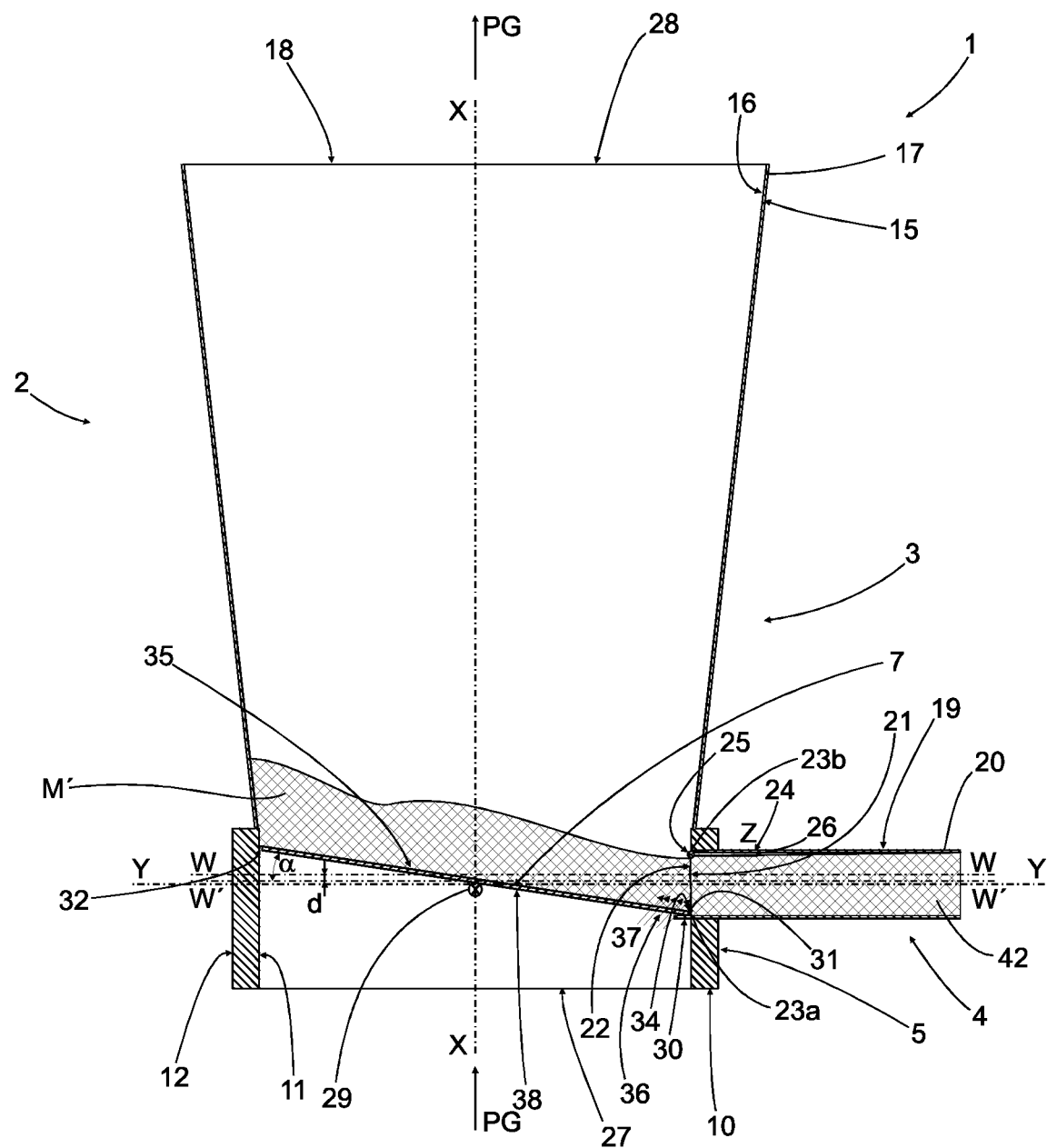

FIG. 12 shows a section along the section plane A-A of FIG. 10 from the diagram of the third embodiment of the fluidizing device 1.

In the emptying condition, the particulate material M' treated in the fluidizing chamber 6 is discharged from the fluidizing unit 3 of the fluidizing device 1 through the material discharge 19 comprising the material channel 42 designed as the emptying pipe 4. The barrier device 24 here swivels around the swivel axis 25 and in the emptying condition releases the material discharge 19—the distributor plate is located at least partly below the upper edge 23b of the material outlet 21.

The distributor plate 7 here swivels on one hand around the swivel axis 29 by an angle α and on the other the swivel axis 29 is moved in the axial direction 33 of the longitudinal axis X-X from a plane W-W into a plane W'-W' aligned parallel to the plane W-W. The lowering of the swivel axis 29 of the distributor plate 7 from a plane W-W into a parallel plane W'-W' moved by a distance d and the simultaneous swivelling of the distributor plate 7 around the swivel axis 29 effects an improved discharge of the treated material M' from the fluidizing chamber 6. In the shown embodiment, the plane W'-W' is arranged above the central axis Y-Y. It is possible, due to this, to keep the angle α, by which the distributor plate 7 swivels around the swivel axis 29, small, so as to minimise the gap 32 forming between the distributor plate 7 and the fluidizing unit 3, in particular the distributor chamber inside wall 11 and/or the fluidizing chamber inside wall 16. This results in a further improved discharge of the treated material M'.

The upper side 35 of the distributor plate 7 is positioned in the emptying position above the lower edge 23a of the material outlet 21. The material discharge 19 having the barrier device 24 is released by the barrier device 24 swivelled around the swivel axis 25 such that the treated material M' can be discharged, assisted by the process gas PG flowing through the discharge opening 36.

The fourth embodiment of the fluidizing device 1 shown in FIGS. 13 to 17 is substantially structurally identical to the first embodiment of the fluidizing device 1 illustrated in FIGS. 1 to 5. The difference between the two embodiments resides in the configuration of the material discharge 19 designed as an emptying pipe 4 and the arrangement of the bar 30 in connection with same.

Figure 13:
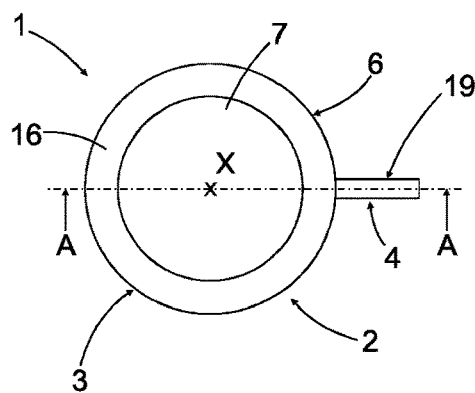

FIG. 13 here shows a top view onto a diagram of a fourth embodiment of the fluidizing device 1 designed as a fluid bed device 2 with a section plane A-A. The fluidizing device 1 comprises a fluidizing unit 3 having a central longitudinal axis X-X on which an emptying pipe 4 comprising a central axis Y-Y perpendicular to the longitudinal axis X-X is arranged, wherein the central axis Y-Y and the longitudinal axis X-X span the section plane A-A. The fluidizing device 1 is in the operating condition.

Figure 14:
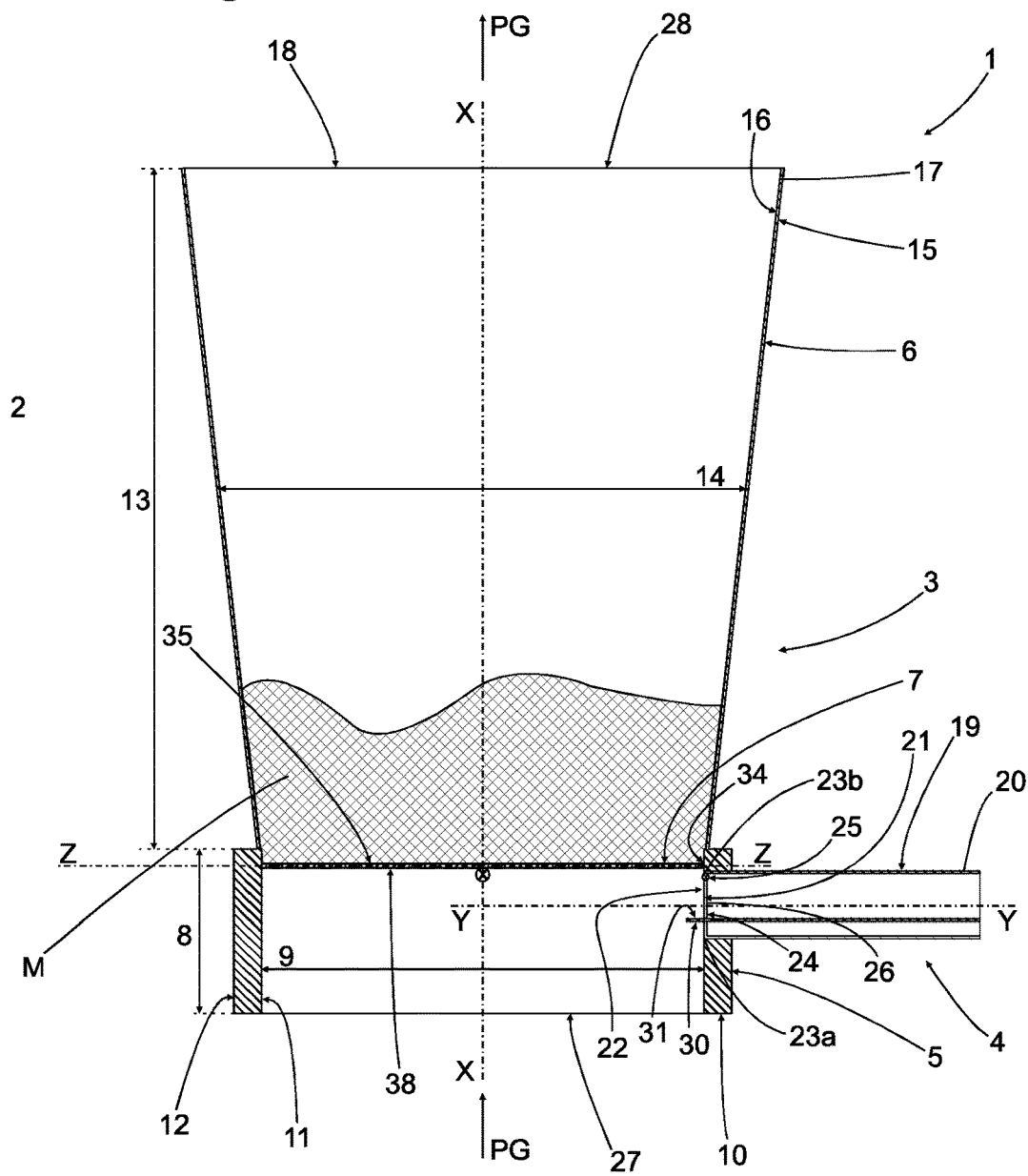

FIG. 14 shows the fluidizing device 1 in the operating condition. Here, the distributor plate 7 located in the plane W-W, separating the distributor chamber 5 from the fluidizing chamber 6, is arranged above the upper edge 23b of the material outlet 21. The material M to be treated is treated in the fluidizing chamber 6 of the fluidizing unit 3 of the fluidizing device 1, in particular by the process gas PG. The process gas PG flows through the fluidizing unit 3 from the fluid inlet 27, through the perforated distributor plate 7 to the fluid outlet 28.

In contrast to the first embodiment, in the fourth embodiment of FIG. 14, a fluid connection 40 comprising a fluid connection outlet 39 for supplying an auxiliary gas HG is assigned to the material discharge 19 designed as an emptying pipe 4. The fluid connection outlet 39 is arranged in the region of the material outlet surface 22 of the material outlet 21.

The material discharge 19 designed as an emptying pipe 4 has a base insert 41. The base insert 41 divides the material discharge 19 into a material channel 42 transporting the treated material M' out of the fluidizing unit 3 and a fluid channel 43 conducting the auxiliary gas HG. The fluid connection outlet 39 is expediently arranged in the base insert 41, such that the auxiliary gas HG can overflow from the fluid channel 43 into the material channel 42. The fluid connection outlet 39 is formed by holes 44 in the base insert 41. Here, the fluid connection outlet 39, in particular the holes 44, is expediently designed such that the auxiliary gas HG has an outflow direction in the direction of the discharge of the treated material M' from the fluidizing device 1.

Figures 15, 16, 17:
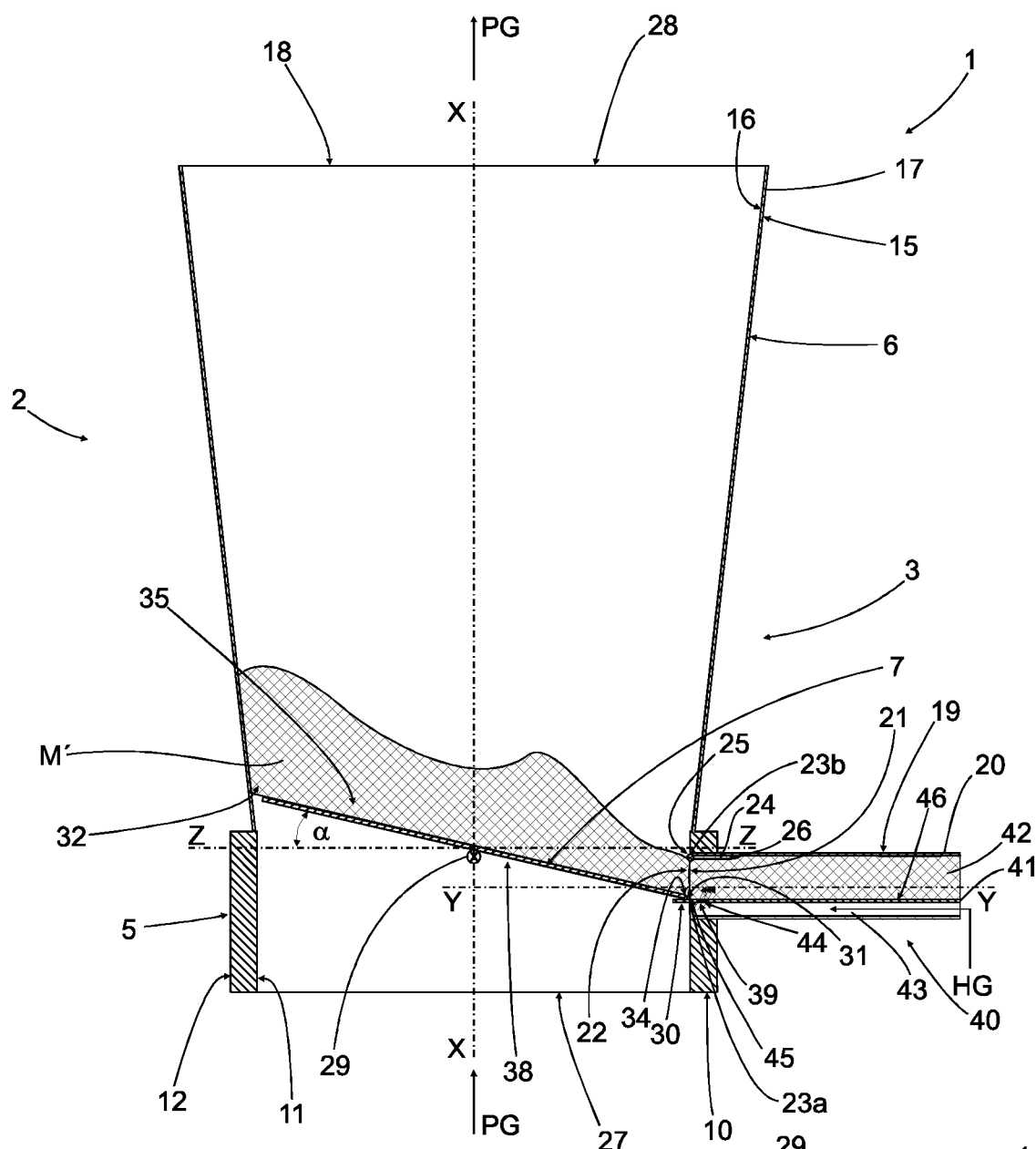

FIG. 15 shows the fluidizing device 1 in the emptying condition. In the emptying condition, the distributor plate 7 is arranged in the emptying position, that is to say the distributor plate 7 has been moved relative to the fluidizing unit 3 such that same is arranged on the bar 30. In the emptying condition, the distributor plate 7 rests on the bar 30. The treated material M' is emptied through the material channel 42, wherein the auxiliary gas HG flows through the fluid connection outlet 39 from the fluid channel 43 into the material channel 42 and thereby assists the emptying of the treated material M' from the fluidizing device 1.

FIG. 16 shows a top view onto a diagram of the fourth embodiment of a fluidizing device 1 according to FIG. 13, wherein the fluidizing device 1 is in the emptying condition. The distributor plate 7 here is arranged in a position on the bar 30 swivelled by the angle α around the swivel axis 29, whereby the gap 32 varying in gap width is formed between the distributor plate 7 and the fluidizing unit 3, in particular the distributor chamber inside wall 11 and/or the fluidizing chamber inside wall 16. Process gas PG flows through the gap 32 during the emptying process, such that no treated material M' can get into the distributor chamber 5.

In the region of the material outlet surface 22, the bar 30 arranged on the distributor chamber inside wall 11 extends in a circumferential direction. The upper side 31 of the bar 30 is arranged on the upper edge 45 of the base insert 41. The upper side 31 of the bar 30 and the upper side 46 of the base insert 41 therefore form adjacent flat upper sides 31, 46 flush with each other. The bar 30 here is crescent-shaped, in particular a crescent moon shape. The bar 30 has an angle β of 160°.

FIG. 17 shows a diagram of a projection of a distributor chamber inside wall 11 comprising the bar 30 and a material outlet 21 of the fourth embodiment of the fluidizing device 1 in the emptying position. As already described in FIG. 16, the upper side 31 of the bar 30 is arranged tangentially to the upper edge 45 of the base insert 41 of the material discharge 19. The upper side 31 of the bar 30 and the upper side 46 of the base insert 41 therefore form adjacent flat upper sides 31, 46 flush with each other. The material outlet surface 22 is thus smaller compared with the material outlet surface 22 of the first embodiment. The material outlet surface 22 is therefore divided into a material outlet surface 22a assigned to the material channel 42 and a material outlet surface 22b assigned to the fluid channel 43. Here, the material outlet surface 22a is released in the emptying condition by the barrier device 24 and the material outlet surface 22b is designed as the distributor chamber inside wall 11.

In the emptying position, the barrier device 24 not illustrated in FIG. 17 releases the material discharge 19, in particular the material outlet surface 22a, such that the treated material M' can be discharged from the fluidizing chamber 6 of the fluidizing unit 3 through the material channel 42 efficiently, and supported by the auxiliary gas HG flowing out from the fluid channel 43. The projected illustration comprises the bar 30 in a crescent-shaped design. The bar 30 has an angle β of approximately 160°.

Figure 18:
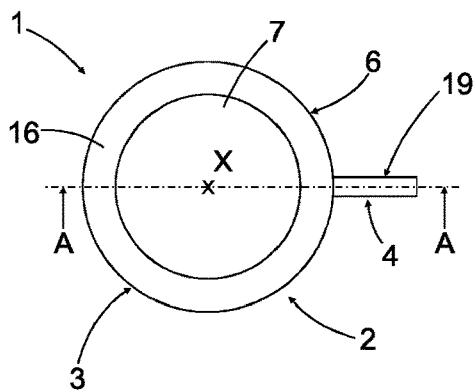
Figure 19:
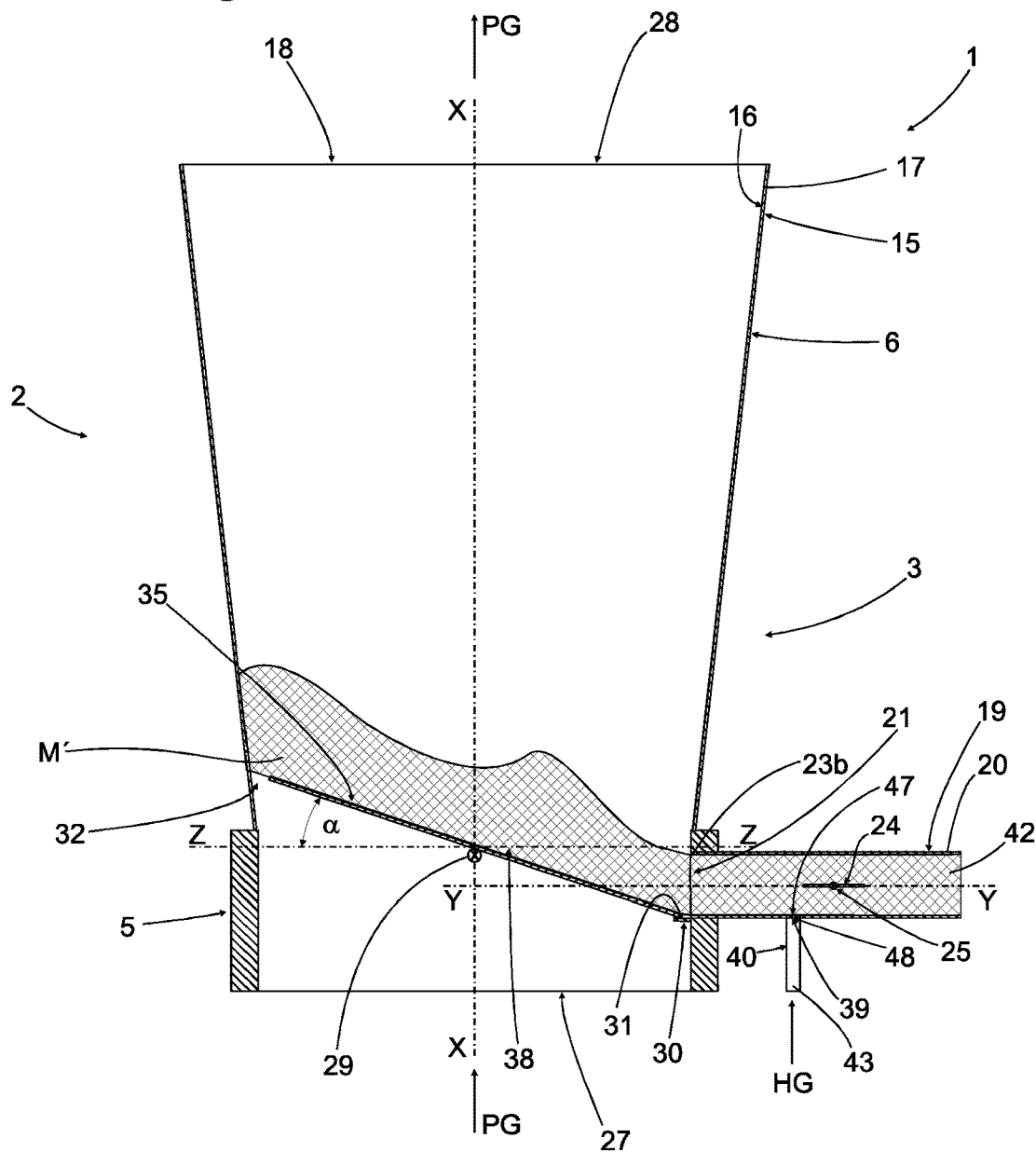

FIGS. 18 and 19 show a further, fifth embodiment of the fluidizing device 1. Here, FIG. 18 shows a top view onto a diagram of the fifth embodiment of a fluidizing device 1 in the operating position with a section plane A-A and FIG. 19 a section along the section plane A-A illustrated in FIG. 18 by the diagram of the fifth embodiment of the fluidizing device 1 in the emptying position with the distributor plate 7 arranged on the swivel axis 29 in a position swivelled by an angle α around the swivel axis 29.

The fifth embodiment is substantially structurally identical to the first embodiment. The two embodiments differ in that the bar 30 is arranged below the material outlet 21 contrary to the direction of flow of the process gas PG. The bar 30 is distanced from the lower edge 23a of the material outlet surface 22.

The two embodiments further differ from each other in that a fluid connection 40 with a fluid connection outlet 39 for supplying an auxiliary gas HG is assigned to the material discharge 19 designed as an emptying pipe 4. The fluid connection outlet 39 is arranged in the emptying pipe wall 20 and is provided with a perforated cover 47. The holes 48 penetrating through the perforated cover 47 are aligned such that the auxiliary gas HG exiting the fluid connection 40 into the material channel 42 flows out of the fluidizing device 1 in the direction of the discharge of the treated material M'.

The barrier device 24 designed as a flap 26 is arranged to swivel around the swivel axis 25, wherein the swivel axis 25 is arranged perpendicular to the central axis Y-Y and crosses it. The flap 26 releases the material discharge 19 illustrated in the emptying position in FIG. 19 so as to empty the fluidizing chamber 6.

The invention claimed is:

1. A method for treating particulate material in a fluidizing device, wherein the fluidizing device comprises a fluidizing unit having a longitudinal axis, the fluidizing unit having a perforated distributor plate dividing the fluidizing unit into a distributor chamber and a fluidizing chamber arranged above the distributor chamber, wherein the fluidizing chamber comprises a material inlet for the material to be treated and the distributor chamber comprises a material discharge having a material outlet for the treated material having a lower and an upper edge over a material outlet surface and a barrier device closes the material discharge and wherein the distributor chamber comprises a fluid inlet and the fluidizing chamber comprises a fluid outlet for a process gas fluidizing the material in the fluidizing chamber flowing from the fluid inlet through the perforated distributor plate to the fluid outlet, wherein in an operating condition, the fluidizing chamber is first filled through the material inlet with material to be treated and the material is then treated by the process gas flowing through the fluidizing chamber, wherein the distributor chamber comprises a bar extending at least partly in a circumferential direction, arranged in the region of the material outlet surface and depending on the operating condition, the distributor plate movably arranged relative to the fluidizing unit is moved to an emptying position such that the distributor plate is arranged in the emptying condition on the bar such that a fluid connection is formed past the distributor plate between the material outlet arranged in the distributor chamber and the fluidizing chamber, and the treated material is discharged from the fluidizing unit through the material outlet, wherein in the emptying condition in the emptying position of the distributor plate, the barrier device releases the material discharge.

2. The method according to claim 1, wherein the fluidizing unit has a swivel axis extending transversely to the longitudinal axis of the fluidizing unit, on which swivel axis the distributor plate is arranged to swivel and around which the distributor plate is swivelled after the particulate material treatment, expediently by 5° to 10°.

3. The method according to claim 1, wherein the distributor plate is arranged movably in the axial direction of the longitudinal axis and is moved in the axial direction of the longitudinal axis as a linear movement, expediently until the distributor plate is positioned below the lower edge.

4. The method according to claim 2, wherein the distributor plate performs a swivelling movement and a linear movement in any order one after the other or at the same time when moving to the emptying position.

5. The method according to claim 1, wherein the distributor plate is moved to the emptying position relative to the fluidizing unit in such a way that at least a part of the distributor plate is positioned below the lower edge of the material outlet.

6. The method according to claim 5, wherein the distributor plate is moved to the emptying position relative to the fluidizing unit in such a way that the distributor plate is positioned below the lower edge of the material outlet.

7. The method according to claim 1, wherein the material discharge has a barrier device, which releases the material discharge as soon as the distributor plate is in the emptying position.

8. The method according to claim 7, wherein the barrier device releases the material discharge as soon as at least a part of the distributor plate is positioned below the lower edge of the material outlet.

9. The method according to claim 1, wherein a fluid connection comprising a fluid connection outlet for supplying an auxiliary gas is assigned to the material discharge designed as an emptying pipe, wherein the auxiliary gas flows through the fluid connection outlet into the material discharge at least when the barrier device releases the material discharge so as to assist the discharge of the treated material.

* * * * *